Patented Apr. 22, 1941

2,238,959

UNITED STATES PATENT OFFICE 2,238,959

PROCESS FOR THE PREPARATION OF NAPHTHAZARIN INTERMEDIATE

Myron S. Whelen, Riverside Gardens, Del., assignor to E. I. du Pont de Nemours & Company, Wilmington, Del., a corporation of Delaware No Drawing. Application May 23, 1939,
Serial No. 275,156

3 Claims. (Cl. 260—396)

This invention relates to an improved process for the preparation of naphthazarin intermediate. The invention relates more particularly to an improved process for isolating the naphthazarin intermediate from the acid reduction solution in which it is formed.

Naphthazarin intermediate which is generally considered to have the formula

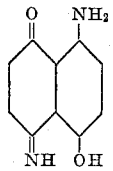

is prepared by the reduction of 1,5-dinitro-naphthalene in acid solution with metals or with sulfur sesquioxide. The naphthazarin intermediate is very soluble in water, as well as in the sulfuric acid solution, in which it is prepared and has heretofore been separated as an insoluble metal salt such as the zinc salt, or as the leuco body which is less soluble than the naphthazarin intermediate itself. The leuco body may be isolated, as such, or as the sodium salt (see German Patents 101,371, 101,372 and 108,551). These German patents also mention the difficulty which has been experienced in the isolation of the naphthazarin intermediate. Originally the naphthazarin intermediate was prepared in solution and then converted to naphthazarin without isolating. (See German Patent 71,386.)

Naphthazarin intermediate, itself, has been found to be a valuable intermediate in the preparation of color bodies which are distinctly different from those prepared from naphthazarin, and considerable research has been carried out in an attempt to provide a method for preparing the naphthazarin intermediate in high yields and isolating it from the byproducts that are formed with it.

It is therefore an object of this invention to provide a simple and economical process for separating the naphthazarin intermediate from the solution in which it is prepared, and in a form which may be readily purified.

When 1,5-dinitro-naphthalene is treated in monohydrate with sulfur sesquioxide in 40% oleum, reduction and rearrangement takes place yielding naphthazarin intermediate of the formula above given, which remains in solution in the mass imparting thereto an intense blue color. I have found that when the reduction mass is maintained sufficiently cool to prevent conversion of the naphthazarin intermediate to naphthazarin in dilute acid solution and is made slightly alkaline with sodium hydroxide, sodium carbonate or other alkaline metal base the naphthazarin intermediate crystallizes out as the sodium salt in the form of readily filterable blue needles together with impurities from which the desired naphthazarin intermediate may be separated by the use of boiling glacial acetic acid.

The following example is given to illustrate the invention. The parts used are by weight.

Example 50 parts of 1,5-dinitronaphthalene are introduced into 375 parts of sulfuric acid monohydrate with stirring. A solution of sulfur sesquioxide previously prepared by dissolving 20 parts of sulfur in fuming sulfuric acid containing 40% of $SO_3$ is slowly added over the course of from 1 to 2 hours under agitation and while maintaining a temperature of 10–15° C. When all the acid solution has been added, the reaction mixture is stirred for a short time and the temperature rises slowly to 25–30° C. The charge is then poured into 3000 parts of ice water and filtered to remove sulfur and other insoluble material. The filtrate is an intense blue solution. To the filtrate cooled by the addition of ice, caustic soda solution is added until the whole becomes definitely alkaline. Precipitation of the sodium salt of naphthazarin intermediate commences before the reaction mass is alkaline and when the neutral or slightly alkaline stage is reached the precipitation is completed and the intense blue coloration of the solution disappears. The blue needles of the sodium salt of naphthazarin intermediate are filtered off and are washed with a very dilute solution of sodium chloride and dried.

The product so obtained is a mixture of at least two products. The crude naphthazarin intermediate is purified by extracting it with 10 parts of glacial acetic acid at the boil. The hot solution is filtered, and from the filtrate pure "naphthazarin intermediate" as the free base is separated on cooling in the form of long blue needles. The remaining glacial acetic acid insoluble material is a dull dark amorphous product. The purified material shows a straw yellow color in concentrated sulfuric acid. On the addition of formaldehyde to the acid solution an intense pure blue coloration results.

Other alkali metal bases may be employed in place of the caustic soda in the above example.

I claim:

1. In the process for preparing naphthazarin intermediate from 1,5-dinitro-naphthalene in acid solution the step which comprises precipitating the naphthazarin intermediate as the alkali metal salt while the solution is maintained at a sufficiently low temperature to prevent the conversion of the naphthazarin intermediate to naphthazarin in dilute acid by rendering the reaction mass slightly alkaline with an alkali metal compound.

2. The process for preparing naphthazarin intermediate which comprises reducing and rearranging 1,5-dinitro-naphthalene in sulfuric acid with sulfur sesquioxide, drowning the resulting mass in water and filtering to remove insoluble materials, neutralizing the resulting acid solution while the solution is maintained at a sufficiently low temperature to prevent the conversion of the naphthazarin intermediate to naphthazarin in dilute acid, by the addition of an alkali metal compound and filtering off the resulting salt of the naphthazarin intermediate.

3. The process of claim 2 in which the naphthazarin intermediate is further purified by extracting the naphthazarin intermediate alkali metal salt filter cake with boiling glacial acetic acid, filtering off the insoluble material, cooling the filtrate and separating out the pure naphthazarin intermediate.

MYRON S. WHELEN.